Patented June 7, 1927.

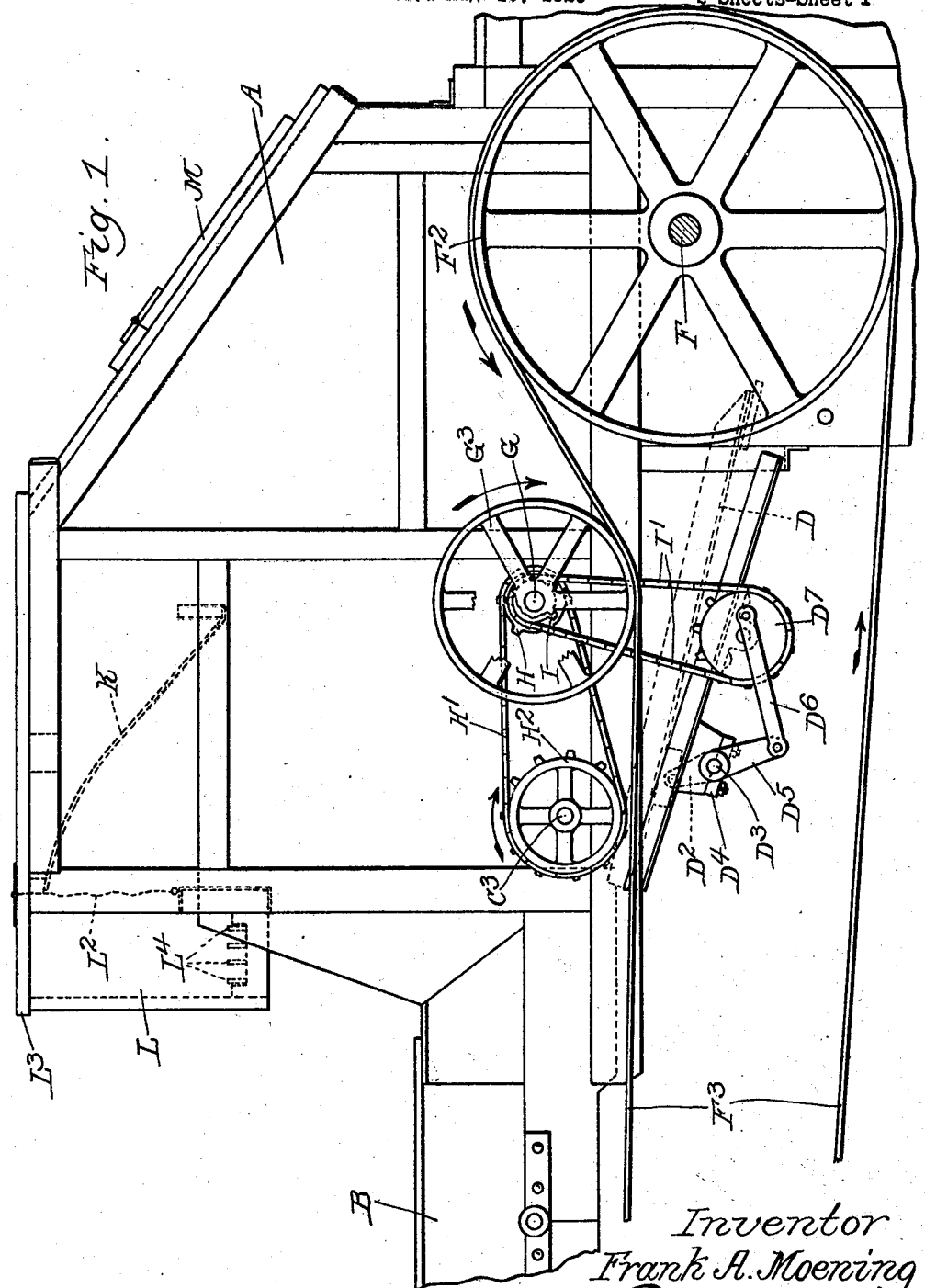

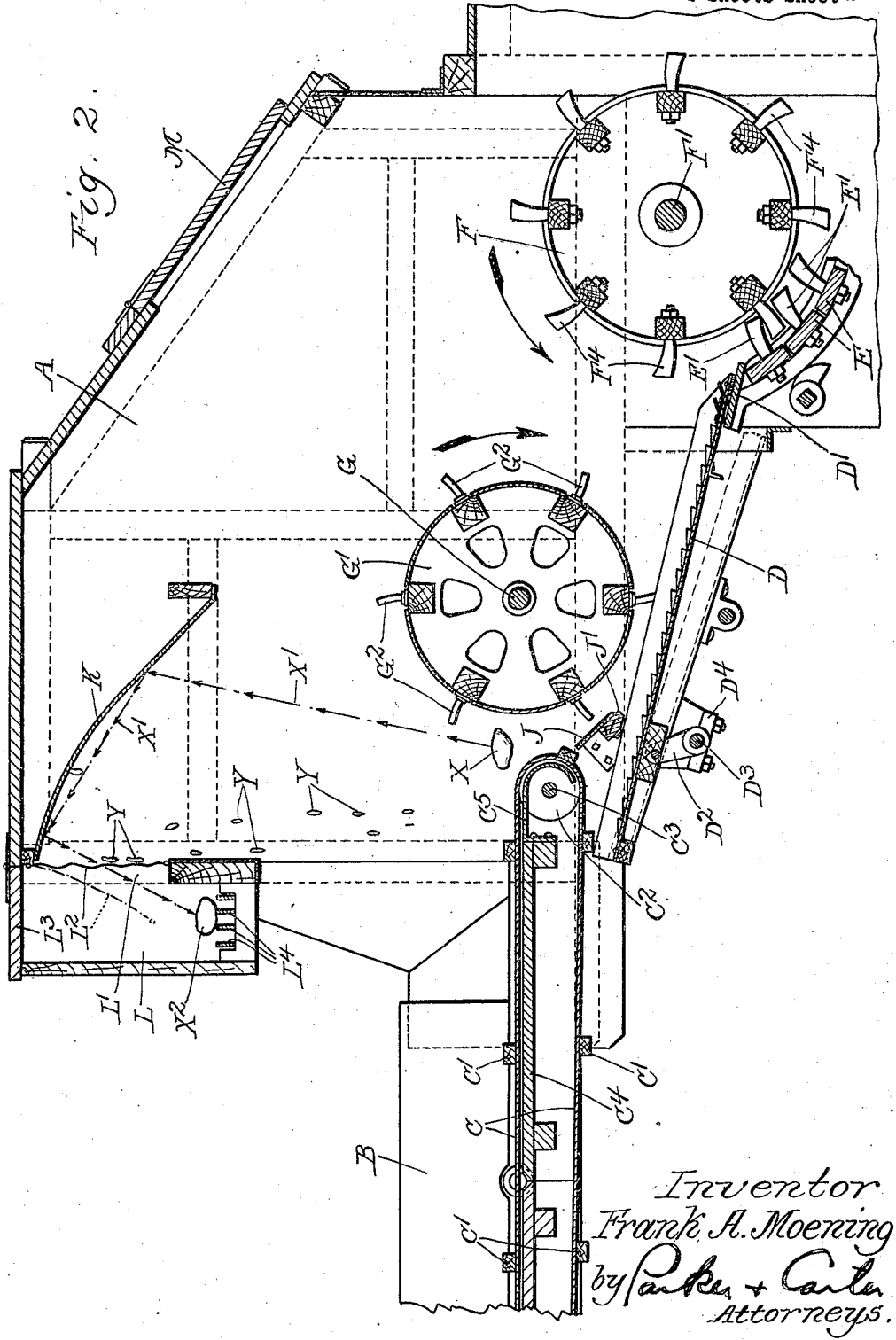

1,631,426

UNITED STATES PATENT OFFICE.

FRANK H. MOENING, OF COE TOWNSHIP, ISABELLA COUNTY, MICHIGAN.

HULLER.

Application filed April 10, 1925. Serial No. 22,013.

This invention relates to a separator and particularly to a machine adapted for use as a bean huller. One object of the invention is to provide means for separating out stones and other injurious matter from the beans before they reach the hulling zone. Another object is to provide means for the accumulation of such material after it has been separated out. Other objects will appear from time to time throughout the specification and claims.

My invention is illustrated more or less diagrammatically in the accompanying drawings, wherein:

Figure 1 is a side elevation of a portion of a huller to which my invention is applied;

Figure 2 is a longitudinal vertical cross section of the machine.

Like parts are indicated by like characters throughout.

A represents generally the housing which encloses the mechanism. B is the enclosing and supporting housing within which a conveyor preferably of the belt type is mounted and which conveys the material to the separating zone. C is the belt conveyor provided with slats or cleats $C^1$. It revolves at one end about a pulley $C^2$ which is carried upon a shaft $C^3$. $C^4$ is a floor beneath the belt. $C^5$ is an extended covering member which forms in effect an extension of the floor $C^4$ and is curved about the shaft $C^3$. It serves among other purposes to prevent material which is brought in on the conveyor from falling down and escaping the stone picker drum.

D is a shaking pan. Its lower end is slidably mounted on the plate $D^1$ and adjacent its upper end it is engaged by one or more rocker arms $D^2$ carried on the rock shaft $D^3$ which is journaled in bearings $D^4$ on the feeder frame. At one end of the rock shaft $D^3$ is a lever arm $D^5$ which has attached to its lower end a link $D^6$ which is mounted on a crank carried by the sprocket wheel $D^7$ driven in the manner described below. The rotation of the sprocket wheel $D^7$ through the link moves the rocker arms and the shaft $D^3$. Thus the shaker pan is moved.

E is a concave provided with removable teeth $E^1$ and in co-operation with it is the cylinder F mounted on a shaft $F^1$ which carries at its outer end a driving pulley $F^2$ adapted to be driven by the belt $F^3$ from any suitable power source. Mounted in the cylinder F are removable teeth $F^4$. The details of the concave and its associated parts will not be described further as they form no part of the present invention.

Mounted above the shaker pan on a shaft G is a stone picker cylinder $G^1$ provided with teeth $G^2$ which may be removable and are preferably rearwardly bent as shown. The shaft G carries at its outer end a belt pulley $G^3$ which is in contact with and driven by a belt $F^3$.

Mounted on the shaft G is a sprocket H which through a chain $H^1$ drives the sprocket wheel $H^2$ on the corresponding end of the carrier shaft $C^3$, and thus the carrier shaft is driven. The shaft $G^3$ also carries a second sprocket I which by means of the chain $I^1$ drives the sprocket $D^7$, and thus operates the shaker pan.

Between the carrier and the stone picker cylinder and slightly below the carrier is a shield J. This shield runs transversely across the machine throughout substantially the width of the carrier. It may be flexible and under certain circumstances the members $C^1$ of the carrier will strike it and deflect it slightly downward, and it is to permit this that it is generally preferably flexible. It is removably fastened to a transverse member $J^1$. K is a deflector plate situated in the upper part of the machine. It is preferably metallic.

L is a stone receiving compartment having an open side $L^1$ in which is hung a swinging curtain $L^2$, preferably flexible. In the top of the compartment L is hinged a cover $L^3$. The compartment L has in its bottom, raised slat members $L^4$. M is a swinging cover for a portion of the main casing which may be raised for inspection purposes and to permit entrance into the machine for repairs and other purposes.

Although I have shown an operative device, still it will be obvious that many changes might be made in size, shape and arrangement of parts without departing materially from the spirit of my invention; and I wish, therefore, that my showing be taken as in a sense diagrammatic. Particularly where in the specification and claims I have used the word "grain" I mean grains of any sort. It might be wheat, oats, beans or any material which in growth is associated with pods, chaff, stalks and other matter from which it must be separated.

The use and operation of my invention are as follows:

Material to be threshed or separated is fed upon the carrier. The form of the machine illustrated herewith is designed primarily for use as a bean huller and its operation will be described in connection with hulling beans. The beans which are to be hulled are placed upon a carrier and by it fed to the machine. They pass off the end of the carrier and on falling downward toward the shaker pan the teeth of the stone picker cylinder strike the beans. To some extent they are separated by the operation of the cylinder. Stones, clods of dirt and other foreign matter which is fed in with the beans will be struck by the teeth and be driven upward against the deflector plate. From this they will be deflected against the flexible curtain and the heavier matter will swing the curtain inward and will pass through the open side of the stone receiving chamber and will lodge therein. Some of the lighter matter, such as beans and bean pods may be driven upward and deflected against the curtain, and they will not be sufficiently heavy to swing the curtain aside and therefore they will drop down again into the machine.

X indicates a stone at the time it is struck. It passes along the path $X^1$ being deflected and finally lands in the stone compartment in the position $X^2$. Y Y are beans or bean pods which are driven upward by the stone picker and strike some portion of the deflecting apparatus, but being too light to move the curtain fall back again into the carrier and so into the machine.

I claim:

1. A stone picker adapted to remove foreign material from a stream of grain, which includes a rotating part mounted in the path of the grain and adapted as it is rotated to contact the foreign material and drive it from the stream of grain, in combination with a receiving compartment adapted to receive such material, said compartment having an open side closed by a movable flexible member adapted to be struck by such material and moved thereby to permit the material to enter the receiving compartment, and a deflector against which the material may strike, said deflector being adapted to deflect material against such movable member.

2. A stone picker adapted to remove stones and other foreign material from a stream of grain which includes a rotating cylinder mounted in the path of the grain and provided with members adapted as the cylinder is rotated to contact the stones and drive them upward from the stream of material, in combination with a deflector and a receiving compartment having an open side closed by a swinging flexible cushioning curtain whereby material removed by the stone picker is deflected from the deflector against the curtain and into the receiving pocket.

3. In combination with a separator, means for removing foreign material from the material to be separated, which includes a rotating stone picker mounted in the path of the incoming material and adapted to contact and drive heavy material out of the path of the incoming material and means for catching the heavy material, so driven, which includes an open sided compartment and a swinging flexible member closing said open side, in combination with a deflector means against which the material may strike and adapted to deflect the material from it against such moving member.

4. In combination with a separator a stone picker adapted to remove foreign material from a stream of grain, which includes a rotating part mounted in the path of the grain and adapted as it is rotated to contact the foreign material and drive it from the stream of grain, in combination with a receiving compartment adapted to receive such material, said compartment having an open side closed by a movable flexible member adapted to be struck by such foreign material and moved thereby to permit the material to enter the receiving compartment, and a deflector against which the material may strike, said deflector being adapted to deflect material against such movable member.

5. In combination with a separator having a conveyor and a separating cylinder, a concave, means for removing stones and heavy material from the material to be separated which includes a rotary stone picker cylinder mounted in the incoming path of the machine and provided with projections which strike the material and throw the heavy material upward out of the path of the lighter material, in combination with a deflecting plate and receiving compartment, and a swinging flexible curtain, said stone picker cylinder adapted to throw heavy material against the deflecting plate whereby it is deflected against the curtain, moves it aside and falls into said compartment.

6. A stone picker adapted to remove foreign material from a stream of grain which includes a rotating part mounted in the path of the grain and adapted as it is rotated to contact the foreign material and drive it from the stream of grain, in combination with a receiving compartment adapted to receive such material, said compartment having an open side closed by a swinging member adapted to be struck by such foreign material and moved thereby to permit the material to enter the receiving compartment, and a deflector against which the material may strike, said deflector being adapted to deflect against such swinging member, said swinging member being of such weight that the grain itself when driven against it cannot deflect it sufficiently to pass beyond it.

7. A stone picker adapted to remove stones and other foreign material from a stream of grain which includes a rotating cylinder mounted in the path of the grain and provided with members adapted as the cylinder is rotated to contact the stones and drive them upward from the stream of material, in combination with a deflector and a receiving compartment having an open side closed by a swinging flexible curtain whereby material removed by the stone picker is deflected from the deflector against the curtain and into the receiving pocket, said curtain being of such weight that the grain itself when driven against it cannot deflect it sufficiently to pass beyond it.

8. In combination with a separator, means for removing foreign material from the material to be separated, which includes a rotating stone picker mounted in the path of the incoming material and adapted to contact and drive heavy material out of the path of the incoming material and means for catching the heavy material, so driven, which includes an open sided compartment and a swinging member closing said open side, said swinging member being of such weight that the grain itself when driven against it cannot deflect it sufficiently to pass beyond it.

9. In combination with a separator having a conveyor and a separating cylinder, a concave, means for removing stones and heavy material from the material to be separated which includes a rotary stone picker cylinder mounted in the incoming path of the machine and provided with projections which strike the material and throw the heavy material upward out of the path of the lighter material, in combination with a deflecting plate and receiving compartment, and a swinging curtain, said stone picker cylinder adapted to throw heavy material against the deflecting plate whereby it is deflected against the curtain, moves it aside and falls into said compartment, said swinging curtain being of such weight that the grain itself when driven against it cannot deflect it sufficiently to pass beyond it.

10. In a separator, thrashing means, and a feeder adapted to feed material to said thrashing means, a stone picker, a shield in the path of material as it passes from the feeder to the thrashing means adapted to deflect all the material into effective contact with said stone picker.

11. In a separator, thrashing means, and a feeder adapted to feed material to said thrashing means, a stone picker, a flexible shield in the path of material as it passes from the feeder to the thrashing means adapted to deflect all the material into effective contact with said stone picker.

12. In a separator, thrashing means, and a feeder adapted to feed material to said thrashing means, a stone picker, a shield in the path of material as it passes from the feeder to the thrashing means adapted to deflect all the material into effective contact with said stone picker, and a shield beneath said carrier extending toward said first mentioned shield.

13. In a separator, thrashing means, and a feeder adapted to feed material to said thrashing means, a stone picker, a flexible shield in the path of material as it passes from the feeder to the thrashing means adapted to deflect all the material into effective contact with said stone picker, and a shield beneath said carrier extending toward said first mentioned shield.

14. In a separator, a stone picker, a feeder adapted to feed material to said stone picker. a shield between the end of said feeder and stone picker whereby all material passing over said feeder is brought into effective contact with said stone picker.

15. In a separator, a stone picker, a feeder adapted to feed material to said stone picker, a flexible shield between the end of said feeder and stone picker whereby all material pasing over said feeder is brought into effective contact with said stone picker.

16. In a separator, a stone picker, a feeder adapted to feed material to said stone picker, a flexible shield between the end of said feeder and said stone picker and an additional shield beneath said feeder extending toward said stone picker and said first mentioned shield whereby all material passing over said feeder is brought into effective contact with said stone picker.

17. In a separator, a stone picker, a feeder adapted to feed material to said stone picker, a shield between the end of said feeder and said stone picker and an additional shield beneath said feeder extending toward said stone picker and said first mentioned shield whereby all material passing over said feeder is brought into effective contact with said stone picker.

Signed at Coe Twp., county of Isabella and State of Michigan, this 31st day of March 1925.

FRANK H. MOENING.